United States Patent
Li et al.

(10) Patent No.: US 7,430,566 B2
(45) Date of Patent: *Sep. 30, 2008

(54) STATISTICAL BIGRAM CORRELATION MODEL FOR IMAGE RETRIEVAL

(75) Inventors: Mingjing Li, Beijing (CN); Zheng Chen, Beijing (CN); Liu Wenyin, Beijing (CN); Hong-Jiang Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 371 days.

This patent is subject to a terminal disclaimer.

(21) Appl. No.: 11/056,555

(22) Filed: Feb. 11, 2005

(65) Prior Publication Data

US 2005/0165763 A1 Jul. 28, 2005

Related U.S. Application Data

(63) Continuation of application No. 10/074,941, filed on Feb. 11, 2002, now Pat. No. 6,901,411.

(51) Int. Cl.
G06F 17/30 (2006.01)

(52) U.S. Cl. .................. 707/104.1; 707/3; 707/5; 707/6

(58) Field of Classification Search .................. None
See application file for complete search history.

(56) References Cited

U.S. PATENT DOCUMENTS

| | | | | |
|---|---|---|---|---|
| 5,819,289 | A * | 10/1998 | Sanford, II et al. | 707/104.1 |
| 6,175,829 | B1 * | 1/2001 | Li et al. | 707/3 |
| 6,338,068 | B1 * | 1/2002 | Moore et al. | 707/102 |
| 6,347,313 | B1 * | 2/2002 | Ma et al. | 707/3 |
| 6,480,840 | B2 | 11/2002 | Zhu et al. | 707/3 |
| 6,564,202 | B1 * | 5/2003 | Schuetze et al. | 707/2 |
| 6,738,529 | B1 * | 5/2004 | Crevier et al. | 382/282 |
| 2003/0123737 | A1 * | 7/2003 | Mojsilovic et al. | 382/224 |

OTHER PUBLICATIONS

Huang, Combining Supervised Learning with Color Correlograms for Content-Based Image Retrieve 1997.*

Mingjing Li, Zheng Chen, and Hong-Jiang Zhang, Statistical correlation analysis in image retrieval, Jan. 9, 2002, pp. 1-11.*

Selim Aksoy & Robert M. Haralick, "Graph-Theoretic Clustering for Image Grouping and Retrieval," IEEE Conf. on Computer Vision and Pattern Recognition, Jun. 1999.

Ingemar J. Cox, Matt L. Miller, Thomas P. Minka, Thomas V. Papathomas, & Peter N. Yianilos, "The Bayesian Image Retrieval System, PicHunter: Theory, Implementation and Psychophysical Experiments," IEEE Transactions on Image Processing, vol. XX, 2000, pp. 1-19.

(Continued)

*Primary Examiner*—Cam Y Truong
(74) *Attorney, Agent, or Firm*—Lee & Hayes, PLLC (57) ABSTRACT

The disclosed subject matter improves iterative results of content-based image retrieval (CBIR) using a bigram model to correlate relevance feedback. Specifically, multiple images are received responsive to multiple image search sessions. Relevance feedback is used to determine whether the received images are semantically relevant. A respective semantic correlation between each of at least one pair of the images is then estimated using respective bigram frequencies. The bigram frequencies are based on multiple search sessions in which each image of a pair of images is semantically relevant.

15 Claims, 5 Drawing Sheets

OTHER PUBLICATIONS

Yong Rui, Thomas S. Huang, Sharad Mehrotra, & Michael Ortega, "A Relevance Feedback Architecture for Content-based Multimedia Information Retrieval Systems," IFP Lab, Beckman Institute, Department of Computer Science, University of Illinois at Urbana-Champaign, Urbana, IL.

Ye Lu, Chunhui Hu, Xingquan Zhu, HongJiang Zhang, Qiang Yang, "A Unified Framework for Semantics and Feature Based Relevance Feedback in Image Retrieval Systems," Microsoft Research China, Beijing, China.

Zheng Chen, Liu Wenyin, Feng Zhang, Mingjing Li, Hongjiang Zhang, "Web Mining for Web Image Retrieval," Microsoft Research China, Beijing, China, pp. 1-15.

Philip Clarkson & Ronald Rosenfeld, "Statistical Language Modeling Using the CMU-Cambridge Toolkit," Cambridge Univeristy Engineering Department, Cambridge, and School of Computer Science, Carnegie Mellon University, Pittsburgh, PA.

Jing Huang, S. Ravi Kumar & Mandar Mitra, "Combining Supervised Learning with Color Correlograms for Content-Based Image Retrieval," Department of Computer Science, Cornell University, Ithaca, NY 14853.

Hongjiang Zhang, Liu Wenyin & Chunhui Hu, "iFind-A System for Semantics and Feature Based Image Retrieval over Internet," Microsoft Research China, Beijing 100080, China.

* cited by examiner

STATISTICAL BIGRAM CORRELATION MODEL FOR IMAGE RETRIEVAL

RELATED APPLICATIONS

This patent application is a continuation under 37 CFR 1.53(b) of U.S. patent application Ser. No. 10/074,941, filed on Feb. 11, 2002, titled "A Statistical Bigram Correlation Model for Image Retrieval", commonly owned herewith, and hereby incorporated by reference.

TECHNICAL FIELD

The following description relates to image or electronic image retrieval.

BACKGROUND

Digital images are increasingly more common as scanners and digital cameras drop in price and increase in availability and function. As users such as digital photographers, artists, and so on, amass large collections of digital photographs on their computers, the challenges involved with querying and accessing digital images on local and networked computing systems increase. Thus, digital image users increasingly rely on conventional image retrieval technology to help query and access digital images from various data stores. Such image retrieval technology includes keyword-based image retrieval or content-based image retrieval.

Keyword-based image retrieval finds images by matching keywords from a user query to keywords that have been manually added to the images. Thus, these images have been manually annotated with keywords related to their semantic content. One of the more popular collections of annotated images is "Corel™ Gallery", an image database from Corel Corporation that includes upwards of one million annotated images.

Unfortunately, with keyword-based image retrieval systems, it can be difficult or impossible for a user to precisely describe the inherent complexity of certain images. Additionally, image annotation is a subjective process—what may be important to one user may not be important to another. As a result, retrieval accuracy can be severely limited because some images—those that cannot be described or can only be described ambiguously—will not be retrieved successfully. In addition, due to the enormous burden of manual annotation, there are a limited number of databases with annotated images.

Although image retrieval techniques based on keywords can be easily automated, they suffer from the same problems as the information retrieval systems in text databases and web-based search engines. Because of wide spread synonymy and polysemy in natural language, the precision of such systems is very low and their recall is inadequate. (Synonymy is the quality of being synonymous; equivalence of meaning. Polysemy means having or characterized by many meanings). In addition, linguistic barriers and the lack of uniform textual descriptions for common image attributes severely limit the applicability of the keyword based systems.

Content-based image retrieval (CBIR) systems have been built to address many issues, such as those of keyword-based systems. These systems extract visual image features such as color, texture, and shape from the image collections and utilize them for retrieval purposes. These visual image features are also called "low-level" features. Examples of low-level features of an image include color histogram, wavelet based texture descriptors, directional histograms of edges, and so forth. CBIR systems work well when the extracted feature vectors accurately capture the essence of the image content.

For example, if a user is searching for an image with complex textures having a particular combination of colors, this type of query is extremely difficult to describe using keywords, but it can be reasonably represented by a combination of color and texture features. On the other hand, if a user is searching for an object that has clear semantic meanings but cannot be sufficiently represented by combinations of available feature vectors, the content-based systems will not return many relevant results. Furthermore, the inherent complexity of the images makes it almost impossible for users to present the system with a query that fully describes their intentions. Accordingly, although CBIR solves many of the problems of keyword-based image retrieval, conventional CBIR technology has a number of shortcomings.

One such shortcoming, for example, is that searches may return entirely irrelevant images that just happen to possess similar features. Individual objects in images contain a wide variety of low-level features. This increases the likelihood that completely irrelevant images will be returned in response to a query that is based on low-level features. Therefore, using only the low-level features of an image to describe the types of images that the user wishes to locate will not typically satisfactorily describe what a user desires to retrieve.

Another shortcoming, for example, is that users typically desire to locate images that are based on specific semantic concepts, rather than images that include certain low-level features. Semantic concepts include meaningful content of an image—for example, a river, a person, a car, a boat, etc. Although objectively measurable, low-level image features lack specific meaning. Additionally, mapping semantic concepts to low-level features is still impractical with present computer vision and Al techniques. Accordingly, the disparity between semantic content and low-level features that lack specific meaning substantially limits the performance of conventional CBIR systems.

To improve this situation, some CBIR systems utilize user feedback to gain an understanding as to the relevancy of certain images. The user feedback is in the form of selected exemplary images. These exemplary images may be called "feedback" images. A user feedback selects such exemplary images to narrow successive searches. A common approach to relevance feedback is estimating ideal query parameters using the low-level image features of the exemplary images. Thus, relevance feedback assists in mapping low-level features to human recognition of semantic concepts.

In a relevance-feedback CBIR system, a user submits a query and the system provides a set of query results. More specifically, after a query, the system presents a set of images to the user. The user designates specific images as positive or negative. Positive indicates that the image contains the semantic concepts queried and negative indicates that the image does not contain such concepts. Based upon this feedback, the system performs a new query and displays a new set of resulting images. This means that relevance feedback is dynamically used during the particular single search session to modify a search query vector or distance metric, or to update a probability distribution of images across a database.

Each round of query and feedback in a particular search session may be called an iteration of that particular search session. This query/feedback process continues for some number of iterations or until the user is either satisfied with the overall relevance of the present set of images, or decides to attempt a different search query. In this manner, image relevance feedback from the user may reveal semantic relationships between the retrieved images that are not easily captured by image low-level features.

Unfortunately, image relevance feedback is not typically accumulated or memorized across CBIR search sessions. Rather, such image relevance feedback is typically discarded and not utilized to improve future performance of the CBIR system. The following arrangements and procedures address these and other limitations of conventional CBIR techniques.

SUMMARY

The described arrangements and procedures for improving iterative results of content-based image retrieval (CBIR) using a bigram model to correlate relevance feedback. Specifically, multiple images are received responsive to multiple image search sessions. Relevance feedback is used to determine whether the received images are semantically relevant. A respective semantic correlation between each of at least one pair of the images is then estimated using respective bigram frequencies. The bigram frequencies are based on multiple search sessions in which each image of a pair of images is semantically relevant.

BRIEF DESCRIPTION OF THE DRAWINGS

The same numbers are used throughout the drawings to reference like features and components.

DETAILED DESCRIPTION

The following description sets forth exemplary subject matter to retrieve semantically related images responsive to a search query. The subject matter is described with specificity to meet statutory requirements. However, the description itself is not intended to limit the scope of this patent. Rather, the inventors have contemplated that the claimed subject matter might also be embodied in other ways, to include different elements or combinations of elements similar to the ones described in this document, in conjunction with other present or future technologies.

Incorporation by Reference

The following co-pending patent applications assigned to the assignee hereof, the Microsoft Corporation, are incorporated herein by reference:

U.S. patent application Ser. No. 09/702,292, entitled "Image Retrieval Systems and Methods with Semantic and Feature Based Relevance Feedback", filed on Oct. 30, 2000;

U.S. patent application Ser. No. 09/702,288, entitled "Semi-Automatic Annotation of Multimedia Objects", filed on Oct. 30, 2000; and U.S. patent application Ser. No. 09/823,534, entitled "Relevance Maximizing, Iteration Minimizing, Relevance-Feedback, Content-Based Image Retrieval (CBIR)", filed on Mar. 30, 2001.

Overview

A statistical bigram correlation model for image retrieval is disclosed to accumulate semantic relationships between images from user-provided relevance feedback information. This accumulated information is incorporated into an image retrieval system so that it can be used across multiple search sessions to retrieve semantically consistent images. Specifically, responsive to obtaining results of a search session, probabilities are determined indicating whether images are semantically similar to one another based on the co-occurrence frequency that the images were identified as relevant images during a previous query/feedback session. Such probabilities are dynamically updated in the system during the searching process and can also be trained from user relevance feedback logs.

An Exemplary System

Figure 1:
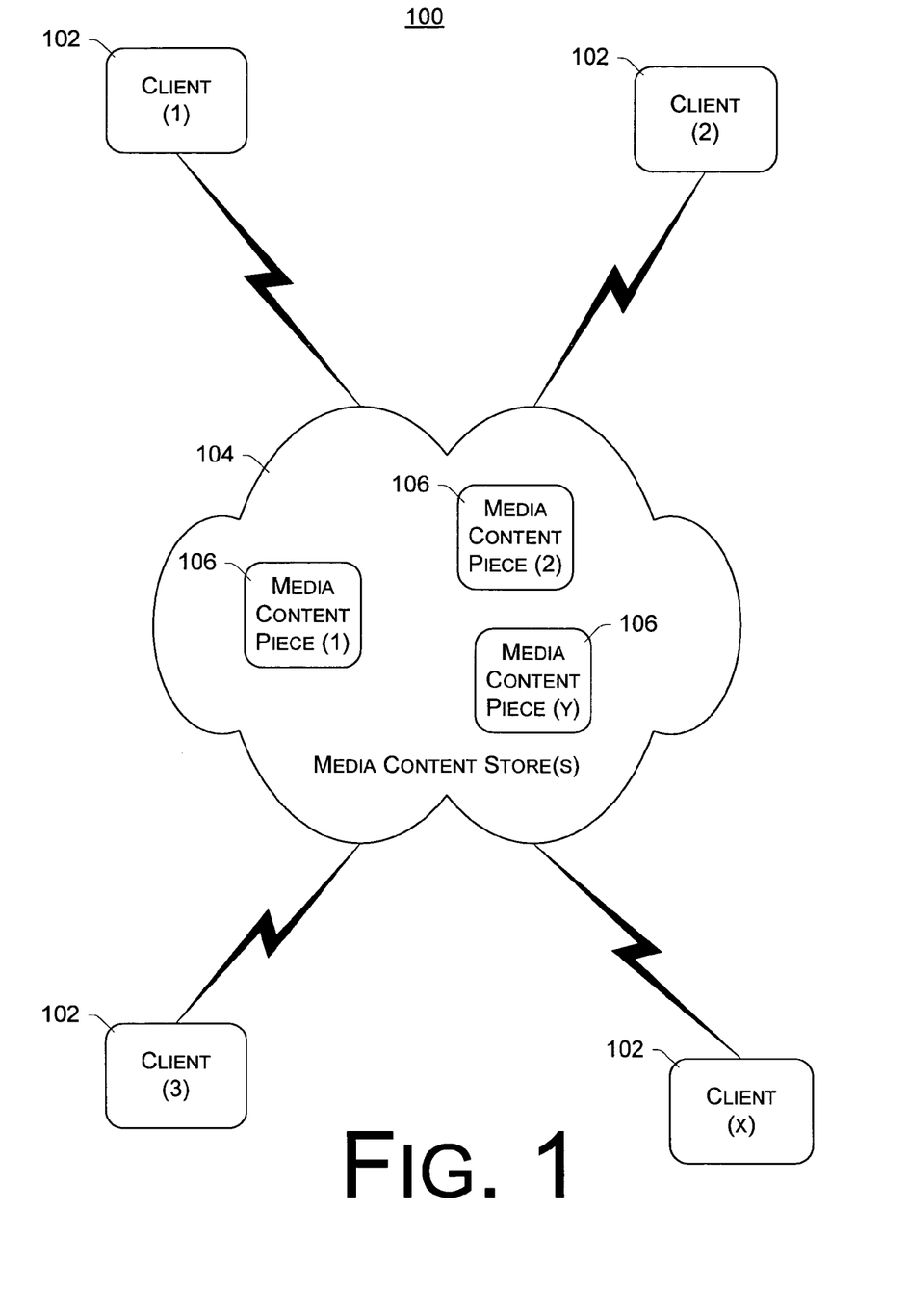
FIG. 1 illustrates an exemplary system that uses a bigram correlation model to accumulate semantic relationships between images from image relevance feedback information.

FIG. 1 illustrates an exemplary system that uses a bigram correlation model to accumulate semantic relationships between images based on user-provided relevance feedback information. In environment 100 one or more (x) clients 102 are coupled to a media content store 104. The media content store 104 is any combination of local storage (e.g., local volatile or non-volatile memory), networked storage (e.g., a parallel connection, an organizational intranet network, the Internet, and so on), or other communication configurations.

These communication configurations provide for electronic exchange of information using an appropriate protocol (e.g., TCP/IP, UDP, SOAP, etc.) between the host device 102 and one or more media content sources or servers that include multiple (y) pieces of media content 106. This electronic exchange provides for client 102 communication with media content store 104 to access (e.g., view, search, download, etc.) pieces of media content 106.

The storage of media content pieces 106 within media content store 104 can be arranged in any of a wide variety of manners and according to any of a wide variety of data formats. For example, media content pieces 106 may be stored on multiple servers hosting Web pages accessible via a network using an appropriate protocol such as Hypertext Transfer Protocol (HTTP). Web pages are documents that a user can view or otherwise render and which typically include links to one or more other pages that the user can access. Web pages are typically stored as one or more files at a remote location(s), being accessed by the user via a computer that is operatively coupled to a network. Web pages often include multiple pieces of media content 106.

Media content pieces 106 include still images, frames of motion video, audio, multimedia, and so on. A piece of media content 106 refers to media content that can be rendered such as a single visual image, and the like.

A user of a client 102 searches the media content store 104 for pieces of media content 106. As a user operates within the computing environment of a client 102, the client 102 monitors the user's search session activities and detects a user's relevance feedback that indicates which of a number of pieces of media content 106 are relevant to a search session. The client 102 uses a statistical bigram correlation model to accumulate semantic relationships between images from user-provided relevance feedback information. Aspects of the bigram correlation model are described in greater detail below in reference to FIG. 2. This accumulated information can be used across multiple image search sessions conducted on the client 102 to retrieve semantically consistent images corresponding to a respective search operation.

An Exemplary Client Computer 102

Figure 2:
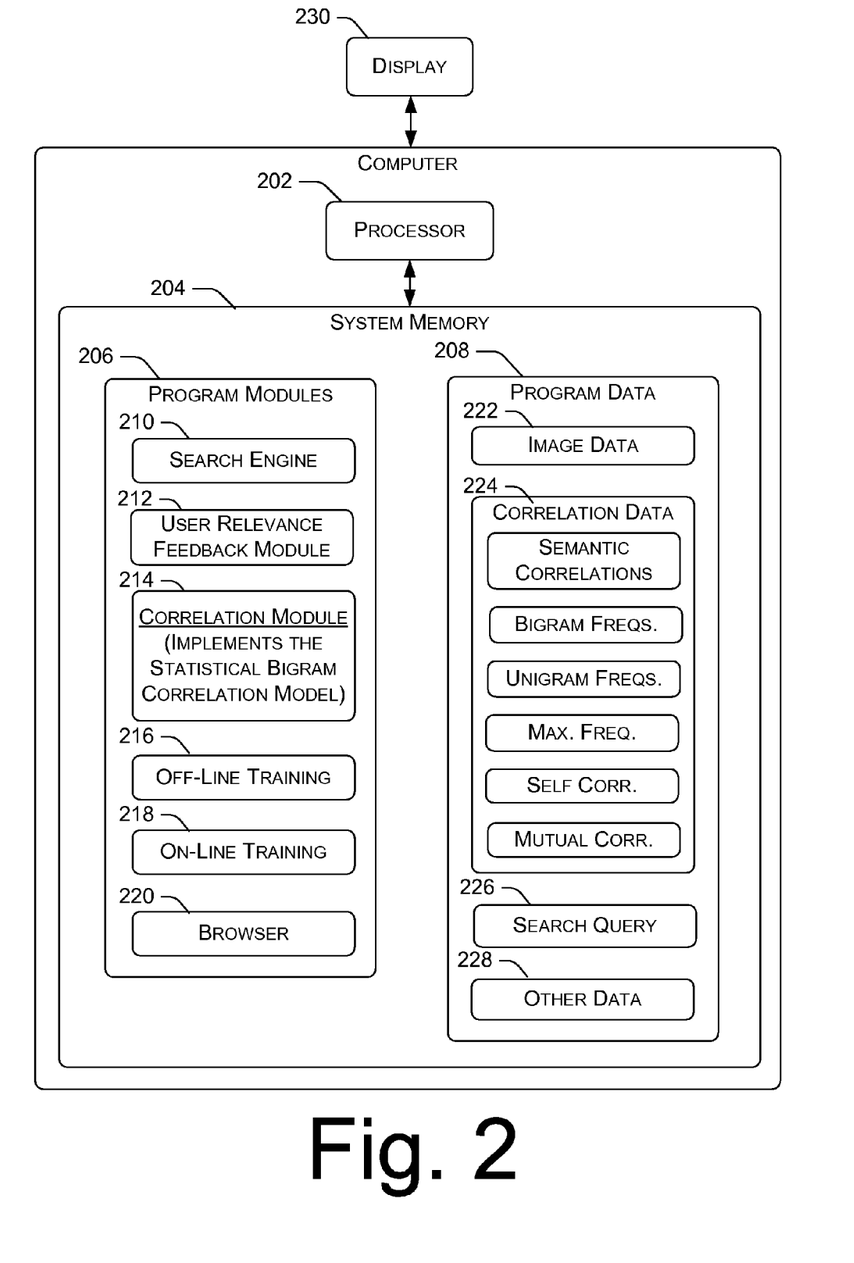
FIG. 2 shows an exemplary host computer that uses a bigram correlation model to accumulate semantic relationships between images from user-provided relevance feedback information.

FIG. 2 shows an exemplary computing device 102 that uses a bigram correlation mode to accumulate semantic relationships between images from user-provided relevance feedback information. The computer 102 is operational as any one of a number of different computing devices such as a personal computer, an image server computer, a thin client, a thick client, a hand-held or laptop device, a multiprocessor system, a microprocessor-based system, a set top box, programmable consumer electronics, a wireless phone, an application specific integrated circuit (ASIC), a network PC, minicomputer, mainframe computer, and so on.

The host computer includes a processor 202 that is coupled to a system memory 204. The system memory 204 includes any combination of volatile and non-volatile computer-readable media for reading and writing. Volatile computer-readable media includes, for example, random access memory (RAM). Non-volatile computer-readable media includes, for example, read only memory (ROM), magnetic media such as a hard-disk, an optical disk drive, a floppy diskette, a flash memory card, a CD-ROM, and so on.

The processor 202 is configured to fetch and execute computer program instructions from program modules 206; and configured to fetch data 208 while executing the program modules 206. Program modules typically include routines, programs, objects, components, data structures, etc., for performing particular tasks or implementing particular abstract data types.

Program modules 206 include the search engine module 210, a user relevance feedback module 212, a correlation analysis module 214, an off-line training module 216, an on-line training module 218, a Web browser module 220, an operating system (not shown), and so on. Program data 208 includes, image data 222, correlation data 224 (e.g., a bigram frequency, a unigram frequency, a maximum frequency, a self correlation value, a mutual correlation value, and so on), and other data 226 (e.g., a number of search sessions conducted on the client 102, user log of image relevance feedback, etc.), and so on.

The search engine 210 search session starts with a query phase, which is possibly followed by one or more user feedback and image correlation phases. The search engine 210 or query handler receives a search query that is generated from information input by a user. Such queries may be in the form of natural language queries, individual word queries, or image queries that contains low-level features of an example image that forms the basis of the search.

Natural language queries and individual word queries include a textual description of the search criteria pertaining to the types of images desired. Textual description is converted to a text feature vector by extracting keywords and stored as a query vector 226. If an image is used for the search criteria, low level features of the image are extracted and used to generate the initial query feature vector 226. Depending on the query type, the query handler 210 initiates either a keyword-based or feature-based search of the media content store 104 of FIG. 1.

The user relevance feedback module 212 displays at least a portion of the images 222 returned by the search engine 210 for user feedback. The feedback module 212 ranks the retrieved images according to their relevance to the query 226. If no previous user feedback 228 has yet been acquired, the images 222 are ranked based on the similarity of the images to feature vectors in the query. As discussed in greater detail below in reference to the correlation module 214, the final ranking score for each retrieved image 222 image is the weighted sum of the feature similarity measure (i.e., with respect to the search query) and semantic support for the image. A display device 230 operatively coupled to the computer 102 displays the ranked images 222 via a user interface with which the user can mark or otherwise identify individual images as more, less, or not relevant to the query. The user feedback module 212 records such user feedback into a user log 228, which indicates those images deemed relevant to one or more search sessions (i.e., positive feedback) and which images are riot (i.e., negative feedback). Only those images with a highest range of ranking scores may be displayed. Such a range can be determined with a predefined threshold or by determining that only a fixed number of images will be retrieved.

The correlation module 214 imposes semantic constraints to the image(s) 222 retrieved by the search engine 210 in response to the user input search query 226. Any imposed semantic constraints are based on previously provided (i.e., identified in a user log 228) or presently provided user image relevance feedback information. That is, each retrieved image 222 is assigned a semantic support (i.e., the semantic correlation value 224).

Initially, the semantic support of an image is set to its feature-based similarity:

$P(I)=S(I)$, where $0 \leq S(I) \leq 1$ is the similarity of Image $I$.

If the user provides any relevance feedback via the feedback module 212, the similarity measure S(I) is refined accordingly, and the images are re-ranked. For instance, the similarity measure of relevant images is set to 1, while that of irrelevant ones is set to 0, and that of other images is recalculated. In this way, contribution from non-feedback ones in the retrieved list of images is discounted because of their uncertainty in terms of semantic similarities to the query. Then the semantic support P(I) is iteratively updated through the correlation model for a number of k times according to the following formulas:

$$P'(I) = \sum_{j=1}^{M} P(I_j) * R(I, I_j) \Big/ \sum_{j=1}^{M} P(I_j),$$

$$P(I) = P'(I),$$

where $R(I,I_j)$ is the correlation between image I and $I_j$, $I_j$ (j=1, ..., M) are M images with the highest similarities. (Various formulas for determining $R(I,I_j)$ are discussed below). The final ranking score (i.e., other data 228) of each retrieved image 222 is then the weighted sum of the calculated feature similarity measure and the semantic support:

$\text{Score}(I)=w*P(I)+(1-w)*S(I)$, $0 \leq w \leq 1$, where S(I) is the similarity measure of image I, P(I) is its semantic support, w is the semantic weight. Images with the highest scores are returned to the user as the final retrieval results.

Semantic Correlation Between Images

The correlation module 214 estimates the semantic correlation between two images 222 based on the number of search sessions in which both images are marked by the user (via the feedback module 212) as being relevant to the search session. The number of search sessions in which two images are jointly labeled as relevant is referred to as bigram frequency 224. The number of search sessions wherein an image is labeled as relevant is referred to as unigram frequency 224.

The maximum value of all unigram and bigram frequencies is referred to as maximum frequency 224. The mutual correlation 224, i.e., the correlation between two different images, is defined as the ratio between their bigram frequency and the maximum frequency 224. The self-correlation 224, i.e., the correlation between an image 222 and itself, is defined as the ratio between its unigram frequency 224 and the maximum frequency 224. Since the bigram frequency 224 is symmetric, the defined semantic correlation 224 is also symmetric. Thus, a triangular matrix is used to represent the correlation model of correlation module 214.

To fully utilize the information provided by the relevance feedback module 212, and to reflect the diversity of users' search intentions, the respective definitions of unigram and bigram frequencies 224 are extended to take account of irrelevant images. Specifically, there is a positive correlation between two relevant images, and a negative correlation between a relevant image and an irrelevant image, but no correlation otherwise. In case that the value of a bigram or unigram frequency is less than zero, the corresponding correlation value is set to zero.

For instance, the semantic correlation R between two images I and J can be determined as follows:

$0 \leq R(I,J) \leq 1$ (attributes);
$R(I,J) = R(J,I)$ (attributes);
if $I = J$ and $U(I) \leq 0$: $R(I,J) = 0$ (attributes);
if $I \neq J$ and $B(I,J) \leq 0$: $R(I,J) = 0$ (attributes);
if $I = J$ and $U(I) > 0$: $R(I,J) = U(I)/T$ (self correlation); or
if $I \neq J$ and $B(I,J) > 0$: $R(I,J) = B(I)/T$ (mutual correlation).

where I,J are two images, B(I,J) is their bigram frequency, U(I) is the unigram frequency of image I, T is the maximum frequency, R(I,J) is the correlation between image I and J.

The correlation module 212 stores calculated semantic correlation data 224 into the system such as in a user log 228.

Offline Training

The offline training module 216 calculates the unigram and bigram frequencies 224 from the relevance feedback information collected in a user log (i.e., stored in other data 228). Initially, all unigram and bigram frequencies 224 are set to equal zero (0). To overcome data sparseness, search sessions with the same query, either a text query or an image example, are grouped together such that feedback images 220 in different search sessions may obtain correlation information. Within each group of search sessions with the same query, the unigram counts 224 are calculated. Based on these counts 224, the unigram and bigram frequencies 224 are updated accordingly.

The unigram count 224 in a group is calculated as follows. At first, C(I) is set to 0, where C(I) is the unigram count of image I. After that, C(I) is iteratively updated for every session in this group: $C(I) = C(I) + 1$, if image I is labeled as relevant in a session; $C(I) = C(I) - 1$, if image I is labeled as irrelevant in a session; C(I) is unchanged otherwise. This process is repeated for every image in the database 222.

The unigram frequencies 224 are updated as: $U(I) = U(I) + C(I)$. The bigram frequencies 224 of image pairs are updated as:

$B(I,J) = B(I,J) + \min\{C(I), C(J)\}$, if $C(I) > 0, C(J) > 0$,
$B(I,J) = B(I,J) - \min\{C(I), -C(J)\}$, if $C(I) > 0, C(J) < 0$,
$B(I,J) = B(I,J) - \min\{-C(I), C(J)\}$, if $C(I) < 0, C(J) > 0$, or
$B(I,J) = B(I,J)$, otherwise.

Finally, the correlation value 224 is determined as discussed above.

On-Line Training

The online training module 218 dynamically updates the unigram and bigram frequencies 224 with relevance feedback information (i.e., via the relevance feedback module 212) in the current search session (i.e., see, the search engine 210) at the end of each session. Initially, all unigram and bigram frequencies 224 are calculated by offline training module 216 from the user log 226. In this manner, user relevance feedback 224 is utilized across multiple image search sessions. These frequencies 224 are set to 0 if there is no log 226. This algorithm is similar to that of offline training, except that a session group only contains one search session.

The unigram count 224 is calculated as:
C(I) = 1 if I is relevant;
C(I) = −1 if I is irrelevant; and
C(I) = 0 if I is a non-feedback image.

The unigram frequencies 224 are updated as: $U(I) = U(I) + C(I)$.

The bigram frequencies 224 of image pairs are updated as:
$B(I,J) = B(I,J) + 1$, if $C(I) > 0, C(J) > 0$,
$B(I,J) = B(I,J) - 1$, if $C(I) > 0, C(J) < 0$,
$B(I,J) = B(I,J) - 1$, if $C(I) < 0, C(J) > 0$, or
$B(I,J) = B(I,J)$, otherwise.

After that, any affected semantic correlations 224 are updated as discussed above.

An Exemplary Procedure to Retrieve Images for One Search Session

Figure 3:
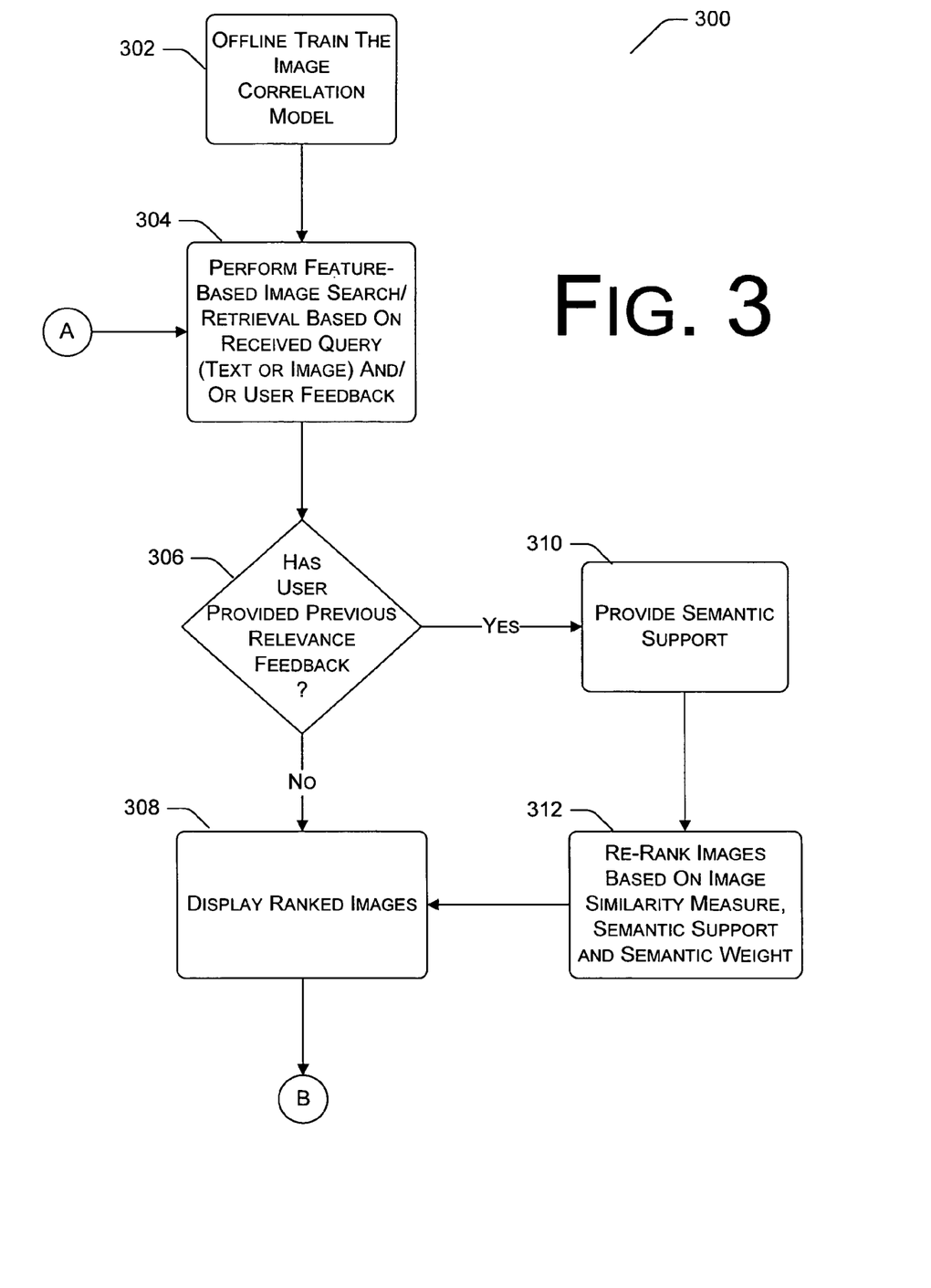
FIG. 3 shows an exemplary procedure to utilize a bigram correlation model to accumulate semantic relationships between images from user-provided relevance feedback information.

Iinitially, all unigram and bigram frequencies are set to zero (0). At block 302, the image correlation model is optionally trained off-line. To overcome a sparse data set, search sessions (block 304) with a same query 226 (i.e., either a text query or an image example query) are grouped together such that feedback images (i.e., relevant, non-relevant, and/or unchanged images) in different sessions may obtain semantic correlation information saved from previous search sessions. Within each group of search sessions with the same query, unigram counts 224 are calculated. Based on these counts 224, the unigram and bigram frequencies 224 are updated accordingly.

Specifically, the off-line correlation training operations are as follows:

(a) initialize all unigram and bigram frequencies to zero;
(b) cluster search sessions with a same query into groups;
(c) calculate the unigram counts within a group;
(d) update the unigram frequencies;
(e) update the bigram frequencies;
(f) repeat operations (c), (d), and (e) for all session groups;
(g) set all negative unigram and bigram frequencies to zero; and
(h) calculate the correlation values R(I,J) according to the above described formulas.

The offline training of the correlation model is optional, because if there is no previous user feedback or user log, the bigram and unigram frequencies are set to zero during online training.

Figure 4:
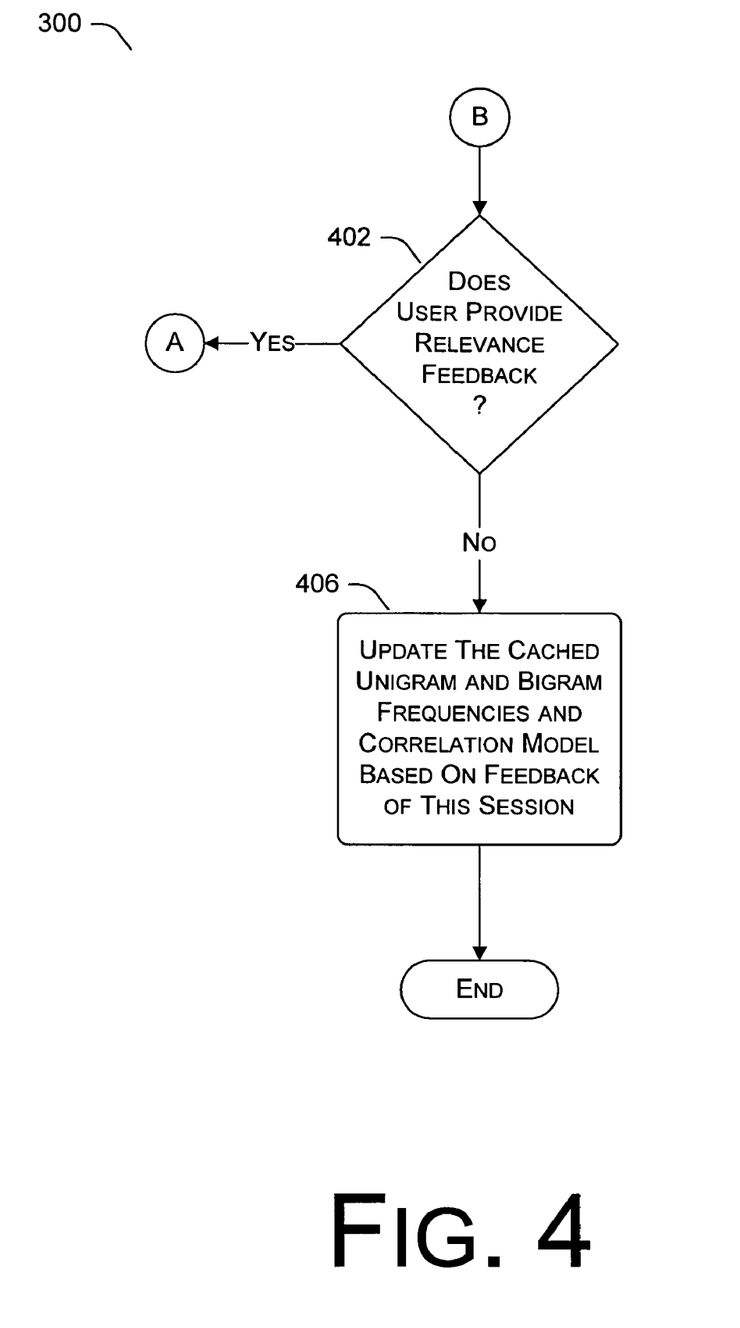
FIG. 4 shows further features of an exemplary procedure to utilize a bigram correlation model to accumulate semantic relationships between images from user-provided relevance feedback information.

At block 304, the procedure 300 performs feature-based image search and retrieval based on a search query 226, which can be either text or image based, or based on provided user feedback (block 402 of FIG. 4). At block 306 the procedure 300 determines whether the user has provided image relevance feedback (i.e., prior user feedback is stored in a user log 228) during/after prior search sessions 304. If the user has not provided previous image relevance feedback, at block 308, the procedure 300 displays ranked images for user feedback and/or selection. The procedure 300 continues at online reference "B" of FIG. 4.

At block 310, it has been determined that they user has provided previous image relevance feedback (block 306), the procedure 300 provides semantic support for each of the retrieved images (block 304) based on the values in the user log 228. At block 312, the procedure 300 re-ranks, reorders, or scores (Score(I)) the images based on image similarity measure S(I), semantic support P(I), and semantic weight w. At block 308 the procedure 300 displays the ranked images for user feedback. The procedure 300 continues at online reference "B" of FIG. 4.

FIG. 4 shows further features of an exemplary procedure 300 to utilize a bigram correlation of relevance feedback for image retrieval. At block 402, the procedure 300 determines whether the user has provided additional relevance feedback with respect to the ranked images presently being displayed (block 306 of FIG. 3). If so, the procedure 300 continues at page reference "A" of FIG. 3.

At block 404, the procedure 300 updates the cached unigram and bigram frequencies and the correlation model based on the feedback of the current session.

Exemplary Computing Environment

Figure 5:
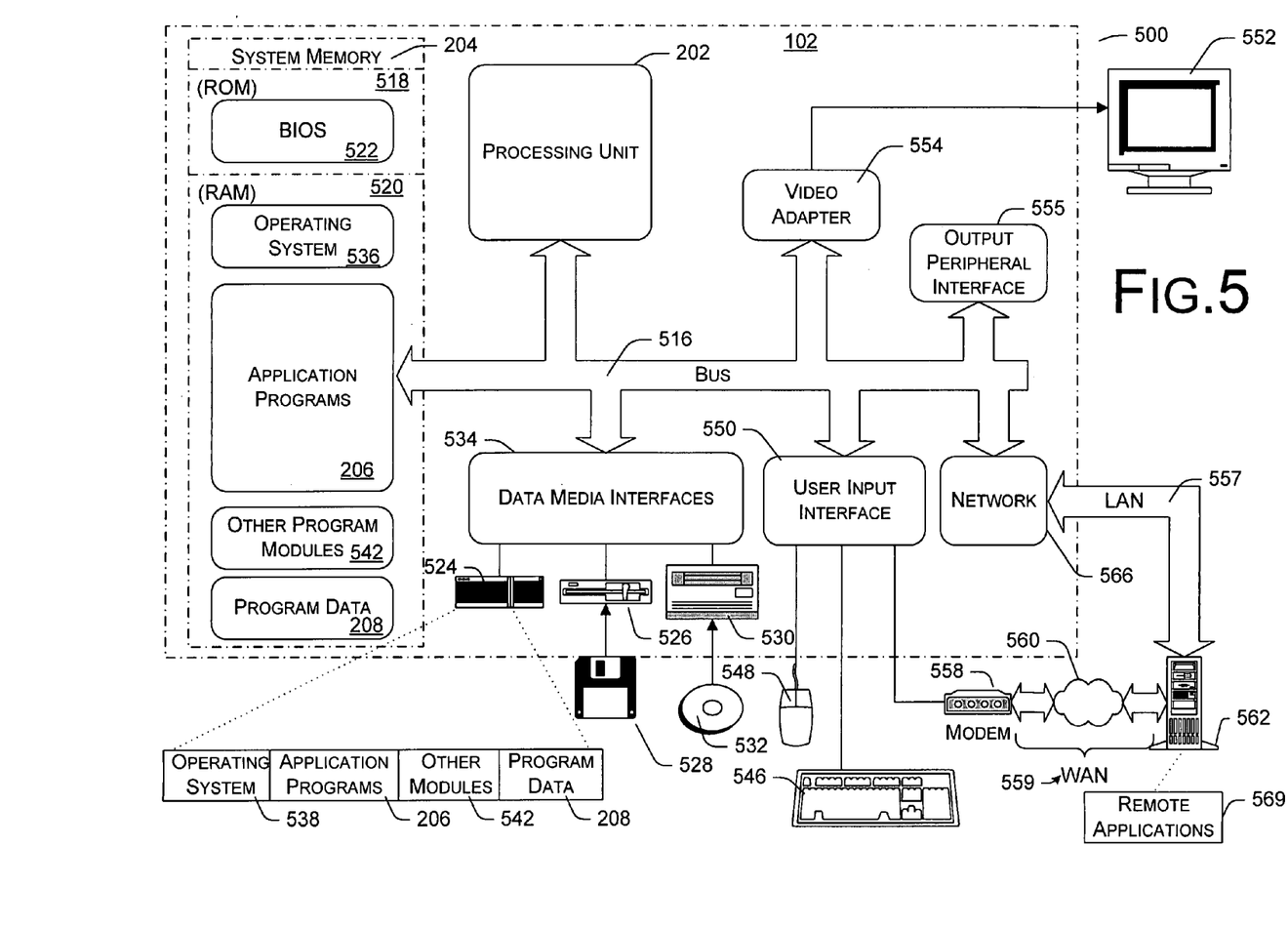
FIG. 5 shows an example of a suitable computing environment on which an exemplary system and procedure to utilize a bigram correlation model to accumulate semantic relationships between images from user-provided relevance feedback information.

FIG. 5 shows an example of a suitable computing environment on which an exemplary system and procedure to utilize a bigram correlation of relevance feedback for image retrieval may be implemented. Exemplary computing environment 500 is only one example of a suitable computing environment and is not intended to suggest any limitation as to the scope of use or functionality of an exemplary system and procedure to cluster queries. The computing environment 500 should not be interpreted as having any dependency or requirement relating to any one or combination of components illustrated in the exemplary computing environment 500.

An exemplary system and procedure to improve iterative results of CBIR using a bigram model to correlate relevance feedback may be described in the general context of computer-executable instructions, such as program modules, being executed by a computer. Generally, program modules include routines, programs, objects, components, data structures, etc., that perform particular tasks or implement particular abstract data types. An exemplary system and procedure to improve iterative results of CBIR using a bigram model to correlate relevance feedback may also be practiced in distributed computing environments where tasks are performed by remote processing devices that are linked through a communications network. In a distributed computing environment, program modules may be located in both local and remote computer storage media including memory storage devices.

As shown in FIG. 5, the computing environment 500 includes a general-purpose computing device in the form of a computer 102 of FIGS. 1 and 2. The components of computer 102 may include, by are not limited to, one or more processors or processing units 202, a system memory 204, and a bus 516 that couples various system components including the system memory 204 to the processor 202.

Bus 516 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 102 typically includes a variety of computer-readable media. Such media may be any available media that is accessible by the computer 102, and it includes both volatile and non-volatile media, removable and non-removable media. For example, the system memory 204 includes computer readable media in the form of volatile memory, such as random access memory (RAM) 520, and/or non-volatile memory, such as read only memory (ROM) 518. A basic input/output system (BIOS) 522, containing the basic routines that help to transfer information between elements within computer 102, such as during start-up, is stored in ROM 518. RAM 520 typically contains data 208 and/or program modules 206 that are immediately accessible to and/or presently be operated on by processor 202.

Computer 102 may further include other removable/non-removable, volatile/non-volatile computer storage media. By way of example only, FIG. 5 illustrates a hard disk drive 524 for reading from and writing to a non-removable, non-volatile magnetic media (not shown and typically called a "hard drive"), a magnetic disk drive 526 for reading from and writing to a removable, non-volatile magnetic disk 528 (e.g., a "floppy disk"), and an optical disk drive 530 for reading from or writing to a removable, non-volatile optical disk 532 such as a CD-ROM, DVD-ROM or other optical media. The hard disk drive 524, magnetic disk drive 526, and optical disk drive 530 are each connected to bus 516 by one or more interfaces 534.

The drives and their associated computer-readable media provide nonvolatile storage of computer readable instructions, data structures, program modules, and other data for computer 102. Although the exemplary environment described herein employs a hard disk, a removable magnetic disk 528 and a removable optical disk 532, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 528, optical disk 532, ROM 518, or RAM 520, including, by way of example, and not limitation, an OS 538, one or more application programs 206, other program modules 542, and program data 208. Each such OS 538, one or more application programs 206, other program modules 542, and program data 208 (or some combination thereof) may include an embodiment of an exemplary system and procedure to improve iterative results of CBIR using a bigram model to correlate relevance feedback.

A user may enter commands and information into computer 102 through input devices such as keyboard 546 and pointing device 548 (such as a "mouse"). Other input devices (not shown) may include a microphone, joystick, game pad, satellite dish, serial port, scanner, or the like. These and other input devices are connected to the processing unit 202 through a user input interface 550 that is coupled to bus 516, but may be connected by other interface and bus structures, such as a parallel port, game port, or a universal serial bus (USB).

A monitor 552 (e.g., the monitor 230 of FIG. 2) or other type of display device is also connected to bus 516 via an interface, such as a video adapter 554. In addition to the monitor, personal computers typically include other peripheral output devices (not shown), such as speakers and printers, which may be connected through output peripheral interface 555.

Computer 102 may operate in a networked environment using logical connections to one or more remote computers, such as a remote computer 562. Logical connections shown in FIG. 5 are a local area network (LAN) 557 and a general wide area network (WAN) 559. Such networking environments are commonplace in offices, enterprise-wide computer networks, intranets, and the Internet. Remote computer 562 may include many or all of the elements and features described herein relative to computer 102.

When used in a LAN networking environment, the computer 102 is connected to LAN 557 via network interface or adapter 566. When used in a WAN networking environment, the computer typically includes a modem 558 or other means for establishing communications over the WAN 559. The modem 558, which may be internal or external, may be connected to the system bus 516 via the user input interface 550 or other appropriate mechanism.

Depicted in FIG. 5 is a specific implementation of a WAN via the Internet. Computer 102 typically includes a modem 558 or other means for establishing communications over the Internet 560. Modem 558, which may be internal or external, is connected to bus 516 via interface 550.

In a networked environment, program modules depicted relative to the personal computer 102, or portions thereof, may be stored in a remote memory storage device. By way of example, and not limitation, FIG. 5 illustrates remote application programs 569 as residing on a memory device of remote computer 562. The network connections shown and described are exemplary and other means of establishing a communications link between the computers may be used.

Computer Readable Media

An implementation of exemplary subject matter to system and procedure to improve iterative results of CBIR using a bigram model to correlate relevance feedback may be stored on or transmitted across some form of computer-readable media. Computer-readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory, CD-ROM, digital versatile disks (DVD), magnetic disk storage which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

CONCLUSION

The described arrangements and procedures provide for a bigram correlation of relevance feedback for image retrieval. Although the arrangements and systems to improve iterative results of CBIR using a bigram model to correlate relevance feedback have been described in language specific to structural features and methodological operations, it is to be understood that the arrangements and procedures as defined the appended claims are not necessarily limited to the specific features or operations described. Rather, the specific features and operations are disclosed as preferred forms of implementing the claimed subject matter.

The invention claimed is:

1. A computer-implemented method for image retrieval using a statistical bigram correlation model, the method comprising:
    receiving a plurality of images responsive to multiple search sessions;
    determining whether the images are semantically relevant images via relevance feedback;
    determining a maximum frequency from a maximum value of bigram and unigram frequencies;
    estimating, via the statistical bigram correlation model, a respective semantic correlation between each image of at least one pair of the images with a respective bigram frequency, each respective bigram frequency being based on multiple search sessions in which said each image of the pair is indicated to be a semantically relevant image, said each respective bigram frequency representing a probability of whether two images that are semantically related to one-another based on a co-occurrence frequency, each image of the two images was relevant in a previous query/feedback session,
    wherein the estimating the respective semantic correlation further comprises:
    associating a respective unigram frequency with each respective image of the images, the respective unigram frequency indicating that said each respective image of the images is either semantically relevant, semantically less relevant, or a non-feedback image, the unigram frequency being based on relevance feedback to a session of the respective multiple search sessions, wherein the respective semantic correlation is further based on the maximum frequency; and
    displaying, responsive to a user operation in an image retrieval session, one or more ranked images to a user based on the respective semantic correlation.

2. The method as recited in claim 1, further comprising:
    assigning a respective ranking score to each of the images based at least in part on the respective semantic correlation corresponding to an image; and
    displaying only those images with a highest range of ranking scores.

3. The method as recited in claim 1, further comprising, responsive to a search session, dynamically updating the respective bigram frequency corresponding to two of the images.

4. The method as recited in claim 1, wherein the respective semantic correlation is: (a) a positive correlation between two semantically relevant images; (b) a negative correlation between a semantically relevant image and a semantically irrelevant image; and (c) no correlation otherwise.

5. The method as recited in claim 1, further comprising identifying, for each image obtained responsive to one or more search sessions of the multiple search sessions, a respective semantic support based on a similarity measure or the respective semantic correlation, the similarity measure corresponding to a similarity of a respective feature vector of the image and a search query corresponding to the session.

6. The method as recited in claim 1, further comprising:
identifying, for each image obtained responsive to one or more search sessions of the multiple search sessions, a respective semantic support based on a similarity measure or the respective semantic correlation, the similarity measure corresponding to a similarity of a respective feature vector of an image and a search query corresponding to the session; assigning a respective ranking score to each image of the images based upon respective similarity measure, the respective semantic support, and a semantic weight; and displaying only images with a highest range of respective ranking scores.

7. The method as recited in claim 1, wherein estimating the respective semantic correlation is determined as follows:

$0 \leq R(I,J) \leq 1$ $R(I,J)=R(J,I);$ if $I=J$ and $U(I) \leq 0$: $R(I,J)=0;$ if $I \neq J$ and $B(I,J) \leq 0$: $R(I,J)=0;$ if $I=J$ and $U(I)>0$: $R(I,J)=U(I)/T;$ or if $I \neq J$ and $B(I,J)>0$: $R(I,J)=B(I)/T;$ wherein I, J are two images, B(I,J) is their bigram frequency, U(I) is the unigram frequency of image I, T is the maximum frequency, R(I,J) is the correlation between image I and J.

8. The method as recited in claim 1, wherein each respective bigram frequency is based on a pair of unigram frequencies, and wherein the method further comprises performing the respective semantic correlation offline by:
(a) initializing all unigram and bigram frequencies to zero;
(b) clustering search sessions with a same query into groups;
(c) calculating unigram counts within a group;
(d) updating unigram frequencies;
(e) updating bigram frequencies;
(f) repeating operations (c), (d), and (f) for all session groups;
(g) setting all negative unigram and bigram frequencies to zero; and
(h) calculating each respective semantic correlation based on results of (a) through (f).

9. The method as recited in claim 1, wherein each respective bigram frequency is based on a pair of unigram frequencies, and wherein the method further comprises performing the respective semantic correlation offline by:
(a) initializing C(I) to zero (0);
(b) iteratively updating C(I) for every session in a group such that:
C(I)=C(I)+1, if image I is labeled as relevant in a session;
C(I)=C(I)−1, if image I is labeled as irrelevant in a session; and
C(I) is unchanged otherwise,
(c) repeating (b) for every image of the images;
(d) updating each respective unigram frequencies as U(I)=U(I)+C(I);
(e) updating each respective bigram frequency of an image pair such that:

$B(I,J)=B(I,J)+\min\{C(I), C(J)\}$, if $C(I)>0, C(J)>0$, $B(I,J)=B(I,J)-\min\{C(I),-C(J)\}$, if $C(I)>0, C(J)<0$, $B(I,J)=B(I,J)-\min\{-C(I),C(J)\}$, if $C(I)<0, C(J)>0$, and $B(I,J)=B(I,J)$, otherwise; and wherein I, J are two images, B(I,J) is their bigram frequency, and U(I) is the unigram frequency of image I.

10. The method as recited in claim 1, wherein each respective bigram frequency is based on a pair of unigram frequencies, and wherein the method further comprises performing the respective semantic correlation online by:
(a) calculating unigram counts in a particular search session;
(b) updating unigram frequencies;
(c) updating bigram frequencies; and
(d) updating each respective semantic correlation between each of the images based on results of (a) through (c).

11. The method as recited in claim 1, wherein each respective bigram frequency is based on a pair of unigram frequencies, wherein a session group comprises a single search session, and wherein the method further comprises performing the respective semantic correlation online by:
(a) responsive to determining that there is a user log, updating calculating each respective unigram and bigram frequency according to data in the user log;
(b) responsive to determining that there is not a user log, initializing each C(I) and B(I) to zero (0);
(c) iteratively updating C(I) for the single search session such that:
C(I)=1, if image I is labeled as relevant;
C(I)=−1, if image I is labeled as irrelevant; and
C(I)=0, if C(I) is a non-feedback image;
(d) updating each respective unigram frequencies as U(I)=U(I)+C(I);
(e) updating each respective bigram frequency of an image pair such that:

$B(I,J)=B(I,J)+1$, if $C(I)>0, C(J)>0$, $B(I,J)=B(I,J)-1$, if $C(I)>0, C(J)<0$, $B(I,J)=B(I,J)-1$, if $C(I)<0, C(J)>0$, or $B(I,J)=B(I,J)$, otherwise; and wherein I, J are two images, and B(I,J) is their bigram frequency.

12. A computer-readable storage medium for image retrieval using a statistical bigram correlation model, the computer-readable storage medium comprising computer-executable instructions for:
receiving a plurality of images responsive to multiple image retrieval search sessions;
determining whether the images are semantically relevant images via relevance feedback;
determining a maximum frequency from a maximum value of bigram and unigram frequencies;
estimating, via the statistical bigram correlation model, a respective semantic correlation between each image of at least one pair of the images with a respective bigram frequency, each respective bigram frequency being based on multiple search sessions in which said each image of the pair is indicated to be a semantically relevant image, said each respective bigram frequency representing a probability of whether two images that are semantically related to one-another based on a co-occurrence frequency, each image of the two images was relevant in a previous query/feedback session, wherein the estimating the respective semantic correlation further comprises:

associating a respective unigram frequency with each respective image of the images, the respective unigram frequency indicating that said each respective image of the images is either semantically relevant, semantically less relevant, or a non-feedback image, the unigram frequency being based on relevance feedback to a session of the respective multiple search sessions, wherein the respective semantic correlation is further based on the maximum frequency; and displaying, responsive to a user operation in an image retrieval session, one or more ranked images to a user based on the respective semantic correlation.

13. The computer-readable storage medium of claim 12, wherein the respective semantic correlation is: (a) a positive correlation between two semantically relevant images; (b) a negative correlation between a semantically relevant image and a semantically irrelevant image; and (c) no correlation otherwise.

14. The computer-readable storage medium of claim 12, wherein each respective bigram frequency is based on a pair of unigram frequencies, and wherein the computer-executable instructions further comprise instructions for performing the respective semantic correlation offline by:

(a) initializing all unigram and bigram frequencies to zero;
(b) clustering search sessions with a same query into groups;
(c) calculating unigram counts within a group;
(d) updating unigram frequencies;
(e) updating bigram frequencies;
(f) repeating operations (c), (d), and (f) for all session groups;
(g) setting all negative unigram and bigram frequencies to zero; and
(h) calculating each respective semantic correlation based on results of (a) through (f).

15. A computing device for image retrieval using a statistical bigram correlation model, the computing device comprising:

a processor; and a memory coupled to the processor, the memory comprising computer-executable instructions that are fetched and executed by the processor for:

receiving a plurality of images responsive to multiple image retrieval search sessions;

determining whether the images are semantically relevant images via relevance feedback;

determining a maximum frequency from a maximum value of bigram and unigram frequencies;

estimating, via the statistical bigram correlation model, a respective semantic correlation between each image of at least one pair of the images with a respective bigram frequency, each respective bigram frequency being based on multiple search sessions in which said each image of the pair is indicated to be a semantically relevant image, said each respective bigram frequency representing a probability of whether two images that are semantically related to one-another based on a co-occurrence frequency, each image of the two images was relevant in a previous query/feedback session, wherein the estimating the respective semantic correlation further comprises:

associating a respective unigram frequency with each respective image of the images, the respective unigram frequency indicating that said each respective image of the images is either semantically relevant, semantically less relevant, or a non-feedback image, the respective unigram frequency being based on relevance feedback to a session of the multiple search sessions, wherein the respective semantic correlation is further based on the maximum frequency; and displaying, responsive to a user operation in an image retrieval session, one or more ranked images to a user based on the respective semantic correlation.

* * * * *